United States Patent [19]

Ukawa et al.

[11] Patent Number: 4,973,570

[45] Date of Patent: Nov. 27, 1990

[54] METHOD FOR PRODUCING A PARALLEL GAS FLOW TYPE CATALYST FOR OXIDIZING SULFUROUS ACID GAS

[75] Inventors: Naohiko Ukawa; Kozo Iida; Tsumoru Nakamura, all of Hiroshima, Japan

[73] Assignee: Mitsubishi Jukogyo Kabushiki Kaisha, Tokyo, Japan

[21] Appl. No.: 331,316

[22] Filed: Mar. 31, 1989

[30] Foreign Application Priority Data

Apr. 1, 1988 [JP] Japan .................................. 63-78212

[51] Int. Cl.$^5$ .......................... B01J 37/00; B01J 23/22
[52] U.S. Cl. ...................................... 502/243; 502/247
[58] Field of Search ................. 502/243, 247; 423/535

[56] References Cited

U.S. PATENT DOCUMENTS

| | | | |
|---|---|---|---|
| 1,862,825 | 6/1932 | Laury | 423/535 |
| 2,029,376 | 2/1936 | Joseph | 502/247 |
| 3,107,223 | 10/1963 | Royer et al. | 502/247 |
| 4,280,926 | 7/1981 | Abe et al. | 502/247 |
| 4,753,908 | 6/1988 | Kawase et al. | 502/62 |

FOREIGN PATENT DOCUMENTS

| | | |
|---|---|---|
| 2919662 | 11/1980 | Fed. Rep. of Germany . |
| 23284 | 6/1972 | Japan .................................. 502/247 |

*Primary Examiner*—Carl F. Dees
*Attorney, Agent, or Firm*—Fleit, Jacobson, Cohn, Price, Holman & Stern

[57] ABSTRACT

In a method for producing a catalyst for oxidizing sulfurous acid gas which uses vanadium pentaoxide as a main catalyst, potassium salts as subsidiary catalysts and diatomaceous earth as a carrier; disclosed is a method for producing a parallel gas flow type catalyst for oxidizing sulfurous acid gas, characterized in that after an ingredient mixture of a solution containing vanadium pentaoxide and potassium salts, diatom earth, water and a binder containing sodium polyacrylate is knead, said ingredient mixture is extrusion molded into a shape in which gas passage holes have a honeycomb or grid structure.

4 Claims, 1 Drawing Sheet

METHOD FOR PRODUCING A PARALLEL GAS FLOW TYPE CATALYST FOR OXIDIZING SULFUROUS ACID GAS

FIELD OF THE INVENTION AND RELATED ART STATEMENT

The present invention relates to a method for producing a catalyst for oxidizing sulfurous acid gas in a plant producing sulfuric acid and, in particular, to a method for producing a parallel gas flow type catalyst for oxidizing sulfurous acid gas.

A so-called contact process for producing sulfuric acid in which a catalyst is used for oxidizing sulfurous acid gas ($SO_2$) and in which sulfuric acid is obtained as sulfur trioxide ($SO_3$) has a long history; vanadium type catalysts were first produced in Japan about 50 years ago and have been used since then. There are several references for methods of producing vanadium type catalysts (for example, Ryusan Handbook, published by Ryusan Kyokai, Dec. 15, 1977, pp.345-347), and a number of improved methods have been made public.

Although such catalysts used to be formed into particles or cylinders most commonly, the catalysts are formed in a ring shape or a flower petal shape in recent years. Furthermore, a reactor has been disclosed which uses a parallel gas flow type catalyst whose gas passage holes are shaped into a honeycomb. While these improvements on the catalyst shape have been made in order to reduce a pressure loss at a catalyst layer, no production method has been established for the parallel gas flow type catalyst for oxidizing sulfurous acid gas.

It is generally more difficult to produce and mold the parallel gas flow type catalyst having gas passage holes of grid or honeycomb shapes, compared to the conventional catalyst that is formed into particles or cylindrical shapes. Since the conventional catalyst is simpler in shape and shorter in length, it can be molded rather easily whether it is formed by extrusion from a metal pattern or it is shaped using a mold. However, the parallel gas flow type catalyst is generally as long as the length of a catalyst layer and has to have a plurality of gas passage holes in its section. It is therefore necessary to form the catalyst into a continuous shape having a grid section or a honeycomb section by providing a plurality of nozzles on a metal mold for shaping the catalyst and by extruding an ingredient powder of the catalyst from these nozzles. In doing so, since the ingredient powder itself does not have a sufficient caking property to be formed into a desired shape, it has been a problem how to add such caking property to the ingredient for easier shaping. Since a catalyst for oxidizing sulfurous acid gas uses, as a carrier, diatom (diatomaceous) earth having silica, which is notorious for being difficult to shape, as a major component, it is particularly difficult to form this catalyst into complicated shapes with a plurality of gas passage holes as mentioned above, and we have not seen any products of this type.

OBJECT AND SUMMARY OF THE INVENTION

It is an object of the present invention to provide a method for shaping a parallel gas flow type catalyst which has been difficult to be formed.

The inventors of the present invention have, after intensive studies on possibilities of such method, invented an effective production method for the catalyst and completed the present invention. The present invention is to provide, in a method for producing a catalyst for oxidizing sulfurous acid gas which uses vanadium pentaoxide as a main catalyst, a potassium salt as a subsidiary catalyst and diatom (diatomaceous) earth as a carrier, a production method for a parallel gas flow type catalyst for oxidizing sulfurous acid gas which is characterized in that after an ingredient mixture of a solution containing vanadium pentaoxide and potassium salts, diatom earth, water and a binder containing sodium polyacrylate is kneaded, this mixture is extrusion molded into a shape in which gas passage holes are arranged in a honeycomb or grid structure.

In the present invention, diatom earth is chosen for a catalyst carrier. A material containing silica as a main component is generally used as a carrier, and it also can be considered to use silica gel as a carrier. However, silica gel shows pronounced dilatancy when extruded, and it is difficult to correct this characteristic. Also, silica gel contains a large amount of water, and this water is released when a catalyst product is baked, causing the catalyst to crack or to deform. Therefore, silica gel cannot be used in the present invention. Since diatom earth, on the other hand, is easy to be extruded and the deformation during baking can be controlled, diatom earth is used as a carrier in the present invention.

Nevertheless, because diatom earth itself does not have a sufficient caking property and, although not so much as silica gel, still shows some dilatancy, it is impossible to mold by extrusion as it is. Therefore, a binding agent or binder has to be added in order to form into a desired shape.

Although, as a binder, a variety of organic materials are known and a combination of a plurality of such materials is usually used, a binder containing sodium polyacrylate is chosen for the binder in the present invention. While the inventors of the present invention have tested numerous binders to find almost all of them to be impossible to be formed into a desired shape, this particular binder provides a caking property with catalyst ingredients, making it possible to shape them, and most of it decomposes and goes out of the product catalyst during the final production step of baking, leaving no ill effects to the catalyst performance. Also, although a sodium component would be left in the product catalyst, it is actually a subsidiary catalytic component of a catalyst for oxidizing sulfurous acid gas and does no harm to the catalyst performance unless its amount is excessive.

The reason for choosing, instead of sodium polyacrylate itself, a binder containing sodium polyacrylate here is that the binder may contain small amounts of materials such as alkali cellulose, sodium alginate, polyethylene glycol, which can also be a binder. Also, the binder may contain polyacrylates other than sodium polyacrylate, such as potassium polyacrylate and/or ammonium polyacrylate.

The catalyst forming materials in the present invention are a solution containing vanadium pentaoxide and potassium salts, diatom earth, water, and a binder containing sodium polyacrylate, which are kneaded together. The mixing ratio of these materials is 20–30 weight % of the solution containing vanadium pentaoxide and potassium salts (pH 9–12), 35–50 weight % of diatom earth, 10–25 weight % of water, and 10–20 weight % of the binder containing sodium polyacrylate.

BRIEF DESCRIPTION OF THE DRAWINGS

FIG. 1 shows gas passage holes arranged in a grid structure, and FIG. 2 shows gas passage holes arranged in a honeycomb structure.

Figure 1:
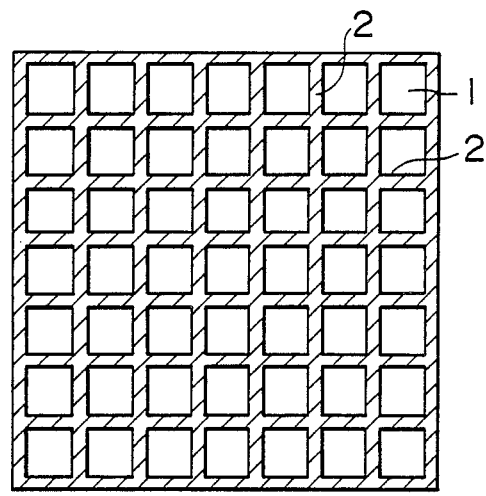
FIGS. 1 and 2 show sections of parallel gas flow type catalysts for oxidizing sulfurous acid gas obtained by the method of the present invention.
Figure 2:
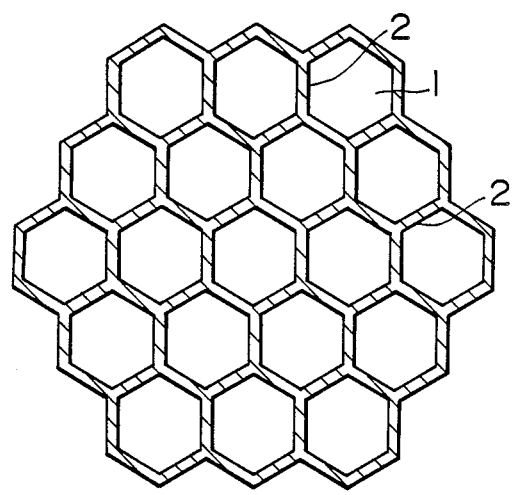

In these FIGS., 1 denotes gas passage holes and 2 indicates walls.

DETAILED DESCRIPTION OF A PREFERRED EMBODIMENT

An embodiment will be shown below of the method for producing a parallel gas flow type catalyst for oxidizing sulfurous acid gas of the present invention. It should, however, be noted that the present invention is by no means restricted to this embodiment.

Vanadium pentaoxide ($V_2O_5$) was added to a solution containing 4 weight parts of potassium hydroxide and 6 weight parts of water so that the content of vanadium pentaoxide ($V_2O_5$) in the final product catalyst would become 6 weight %. Subsequently, sulfuric acid solution was added to this solution (called the original solution hereinafter) to make it weakly alkaline.

This original solution was added to diatom earth together with a binder containing sodium polyacrylate, and the resulting mixture was kneaded after a suitable amount of water was added. The amount of a binder added should be as small as possible: here it was 17 weight % and the amount of diatom earth was 42 weight %. The amount of water added should be chosen as it is most suitable for extrusion. If it is too little the extrusion pressure suddenly increases, making it impossible to extrude. If it is too much, while it is possible to extrude, the catalyst cannot be shaped. Here, the amount of water was 13 weight %.

Next, the kneaded mixture was placed in an extrusion molding machine which contained a metal mold with 100 grid-like gas passage holes whose side was 5.7 mm. After the pressure was reduced to a vacuum, an extrusion product whose length is 500 mm was obtained. Subsequently, this extrusion product was dried and made acidic with $SO_2$ gas and then baked in an electric furnace up to a maximum temperature of 650° C. to obtain a parallel gas flow catalyst for oxidizing sulfurous acid gas.

The content of $V_2O_5$ in the catalyst was 6.0% and that of $K_2O$ was 7.9%. As an example to show that the catalyst thus obtained was in fact capable of oxidizing sulfurous acid gas, a part of the catalyst was cut out and placed in a reaction tube whose inner diameter is 49.5 mm so that the effective volume of the catalyst would be 165 cm$^3$. A gas mixture of a 10.5% concentration of $SO_2$, a 10.2% concentration of $O_2$ and $N_2$ to fill the rest at the entrance was passed through this tube with the catalyst while the tube was kept at a temperature of 470° C. by a heater placed on the outside. $SO_2$ concentrations at the inlet to and the outlet from the catalyst layer were measured and the ratio of conversion was found as shown in Table 1.

From Table 1 it is confirmed that the catalyst obtained in this embodiment can indeed oxidize sulfurous acid gas.

TABLE 1

| Amount of Gas Passing (Nm$^3$/h) | Conversion Ratio (%) |
|---|---|
| 0.496 | 29.8 |
| 0.331 | 44.4 |
| 0.165 | 74.6 |

According to the method of the present invention, it has now become possible to manufacture a parallel gas flow type catalyst for oxidizing sulfurous acid gas which has a grid or honeycomb structure of gas passage holes. When a catalyst obtained by the method of the present invention is used in a chemical plant for producing sulfuric acid, a pressure loss at a catalyst layer can be reduced considerably, and also the blockage by dust contained in an ingredient gas can be prevented. Therefore, the power consumption of a gas flow blower can be reduced.

We claim:

1. In a method for producing a catalyst for oxidizing sulfurous acid gas which uses vanadium pentaoxide as a main catalyst, potassium salts as subsidiary catalysts and diatomaceous earth as a carrier,
   a method for producing a parallel gas flow type catalyst for oxidizing sulfurous acid gas which is characterized in that after an ingredient mixture of a solution containing vanadium pentaoxide and potassium salts, diatom earth, water and a binder containing sodium polyacrylate is knead, said ingredient mixture is molded by extrusion into a shape in which gas passage holes have a honeycomb or grid structure.

2. The method for producing a parallel gas flow type catalyst for oxidizing sulfurous acid gas as claimed in claim (1), which is further characterized in that said binder containing sodium polyacrylate consists of sodium polyacrylate only.

3. The method for producing a parallel gas flow type catalyst for oxidizing sulfurous acid gas as claimed in claim (1), which is further characterized in that said binder containing sodium polyacrylate contains at least one of sodium polyacrylate, alkali cellulose, sodium alginate, and polyethylene glycol.

4. The method for producing a parallel gas flow type catalyst for oxidizing sulfurous acid gas as claimed in claim (1), which is further characterized in that said binder containing sodium polyacrylate comprises sodium polyacrylate and/or potassium polyacrylate and/or ammonium polyacrylate.

* * * * *